United States Patent [19]

Platzer et al.

[11] Patent Number: 5,269,873
[45] Date of Patent: Dec. 14, 1993

[54] APPARATUS FOR PEELING-OFF A FILM LAMINATED ON A CARRIER MATERIAL

[75] Inventors: Stephan J. W. Platzer, Eltville-Erbach; Martin Stork, Muehlheim am Main; Guenter Hultzsch, Wiesbaden, all of Fed. Rep. of Germany; Arthur E. Procter, Long Valley, N.J.; Hans Heist, Wiesbaden, Fed. Rep. of Germany

[73] Assignee: Hoechst Aktiengesellschaft, Frankfurt am Main, Fed. Rep. of Germany

[21] Appl. No.: 929,431

[22] Filed: Aug. 14, 1992

[30] Foreign Application Priority Data

Aug. 21, 1991 [DE] Fed. Rep. of Germany ....... 4127601

[51] Int. Cl.$^5$ .............................................. B32B 35/00
[52] U.S. Cl. .................................... 156/584; 156/344; 430/259
[58] Field of Search ............... 156/247, 344, 584; 271/280, 281, 285, 900; 430/256, 259; 83/27, 452

[56] References Cited

U.S. PATENT DOCUMENTS

| 4,466,849 | 8/1984 | Dantsker | 156/584 X |
| 4,553,191 | 11/1985 | Franks, Jr. | 361/212 |
| 4,752,346 | 6/1988 | Platzer | 156/344 |

FOREIGN PATENT DOCUMENTS

| 3339723 | 5/1985 | Fed. Rep. of Germany. |
| 3443939 | 6/1986 | Fed. Rep. of Germany. |
| 52-27352 | 3/1977 | Japan | 156/584 |
| 1588780 | 4/1981 | United Kingdom. |

Primary Examiner—David A. Simmons
Assistant Examiner—Mark A. Osele
Attorney, Agent, or Firm—Foley & Lardner

[57] ABSTRACT

An apparatus for peeling-off a film from a laminate, the laminate including the film and a carrier material upon which the film is laminated. The apparatus includes a horizontal base plate, and a platform having an upper portion and a lower portion, a front side, and a transverse gap which divides the upper portion from the lower portion. The platform is inclined relative to the horizontal base plate at a vertical to horizontal ratio of ≦10:1 and the laminate is guided over the platform. The apparatus also includes a separating apparatus which is disposed proximate to the transverse gap at a distance from and parallel to the front side of the platform.

27 Claims, 6 Drawing Sheets

APPARATUS FOR PEELING-OFF A FILM LAMINATED ON A CARRIER MATERIAL

BACKGROUND OF THE INVENTION

1. Field of the Invention

The invention relates to an apparatus for drawing-off a film laminated on a carrier material, and more particularly, to an apparatus having a platform which is inclined with respect to the horizontal and over which the laminate of film and carrier material is guided.

2. Description of the Related Art

Light-sensitive layers or coatings, such as for example exposed photoresist layers on circuit boards or color proof-films, are generally covered by protective films. In the production of color proof-films and printed circuit boards, a substrate is first coated with a light-sensitive material. The material is covered with a transparent film. This laminate of film and light-sensitive material is then exposed imagewire through a mask. This exposure can cause an image-forming, differing adhesion of the photosensitive layer in such a way that the exposed parts adhere to the film with a stronger adhesion than the unexposed parts. When the protective film and the substrate are separated from each other, there is for example, a positive image on the substrate, and a negative image on the protective film.

In the production of circuit boards for electric circuits, the substrate is laminated with a light-sensitive dry resist film. The exposure of the dry resist film is performed with the aid of an imaging mask representing the electric circuit, and thereafter the protective film is removed and the dry resist film is developed in various processing steps. The protective film which is disposed on the dry resist film permits a largely dust-free exposure, and allows the transport of the coated circuit boards in a stacked state. The circuit boards can have one or more borders which are free from the laminated-on protective film, so that the board can be grasped at these borders by gripping tools or by hand.

In some laminating operations it is desirable to completely transfer a coating from one surface to another surface, as for example, when transferring a colored resin layer from a substrate to a receiving sheet. In such a case, the coated substrate and a receiving sheet which is laid thereupon are passed under pressure through a laminating nip of heated laminating rolls. The substrate and the receiving sheet are subsequently separated from each other and the colored resin layer is thereby transferred from the substrate to the receiving sheet. A problem which occurs in such transfer processes is that the transfer of the colored resin layer is incomplete.

U.S. Pat. No. 4,752,346 describes an apparatus and a process for detaching and separating films which are adhesively bonded one upon the other. The apparatus comprises a platform made of a metal or of a material upon whose surface there is provided an electrically conductive layer. Over the surface of the platform, there is a bar edge or a wedge. Both the bar edge and the platform surface are electrically grounded. The bar edge is positioned over the platform by means of supports at each end of the bar edge. The supports, which are surrounded by springs, are passed through the bar edge and protrude beyond it. Consequently, it is possible to create a variable gap between the underside of the bar edge and the surface of the platform, making it possible for substrate and film laminates of different thicknesses to pass between the bar edge and platform. For example, a colored photosensitive layer which is covered with a transparent polyester film is laminated via its adhesive layer to a receiving sheet. This sandwich arrangement runs through the nip of laminating rolls and is subsequently introduced between the bar edge and the platform of the drawing-off apparatus. The transparent polyester film is drawn off over the bar edge as the film is bent upward over the edge angle and taken along the bevel of the bar edge. As a result, the polyester film is separated from the receiving sheet and a transfer of the adhesive layer and the colored photosensitive layer to the receiving sheet takes place.

German Offenlegungsschrift 3,443,939 discloses a process for removing a protective film from circuit boards which have been laminated with exposed photoresist, with the aid of an adhering element in sheet form. The adhering element is adhesively attached to the pro film which is to be removed, and is subsequently peeled off the circuit board substantially along its diagonal. In this case, the circuit board is adjusted by a turning apparatus in such a way that an angle of $0° < \alpha < 90°$ is set between the front edge of the board and the normal to the transporting direction. The front corner of the board is subsequently provided both on its upper side and on its underside with a double-sided adhesive adhering element in such a way that parts of the uncovered board, beyond the border of the protective film, are grasped, and the protective film can be drawn off by means of rolls. The apparatus for carrying out the process includes a transporting and adjusting device, by which the body in board form can be swivelled out of its transporting direction into a working position. Furthermore, a device for applying a double-sided adhesive adhering element, which is designed in the form of tongs and has bodies in plate form for receiving bearing rollers, and a device for removing the adhering element and the protective film which is bonded to the adhering element, of the body in board form is also provided. The apparatus also has a system of rolls arranged axially parallel, with a device for keeping the distance between the rolls constant.

German Offenlegungsschrift 3,339,723 discloses a process and an apparatus for detaching a protective film from laminated circuit boards, in which the laminated circuit boards run via transport rollers and are provided on their upper side and underside with a one-sided glued adhesive tape. The protective film is detached by drawing-off of the applied adhesive tape over a bar edge, and is subsequently transported away and stored. The bar edge forms an angle of 45° with respect to the transporting apparatus and the adjoining face likewise forms an angle of 45° with respect to the board plane. The bar edge and the circuit board define a drawing-off gap therebetween.

In the case of the known apparatuses for detaching a protective film from a laminated circuit board, either a continuous or endless adhesive tape, or individual double-sided adhesive elements are used. As a result of this, additional and considerable amounts of such materials are required. Furthermore, additional process steps are required prior to the drawing-off step, in order to bring either the adhesive tape or the adhesive elements onto the protective film of the circuit board.

SUMMARY OF THE INVENTION

An object of the invention is to correct the aforementioned problems by providing an apparatus which requires little horizontal space; provides for a reliable and complete detaching of a film from a carrier material, on which one or more light-sensitive layers are applied; and is performed without requiring the use of an adhesive tape or adhesive element.

This object is achieved by providing an apparatus for peeling-off a film from a laminate, the laminate including the film and a carrier material to which the film is laminated. The apparatus includes a horizontal base plate; and a platform having an upper portion and a lower portion, a front side, and a transverse gap which divides the upper portion from the lower portion. The platform is also inclined relative to the horizontal base plate at a vertical to horizontal ratio of ≦10:1 and the laminate is guided over the platform. The apparatus also includes a separating apparatus which is disposed proximate to the transverse gap at a distance from and parallel to the front side of the platform.

The separating apparatus of the above-described invention can include a bar or a wedge, with the upper edge of the bar or wedge being rounded-off. Moreover, the platform or the base plate of the apparatus can be grounded.

BRIEF DESCRIPTION OF THE DRAWINGS

The invention is explained in more detail below with reference to the drawings, in which.

DETAILED DESCRIPTION OF THE PREFERRED EMBODIMENTS

Figure 1:
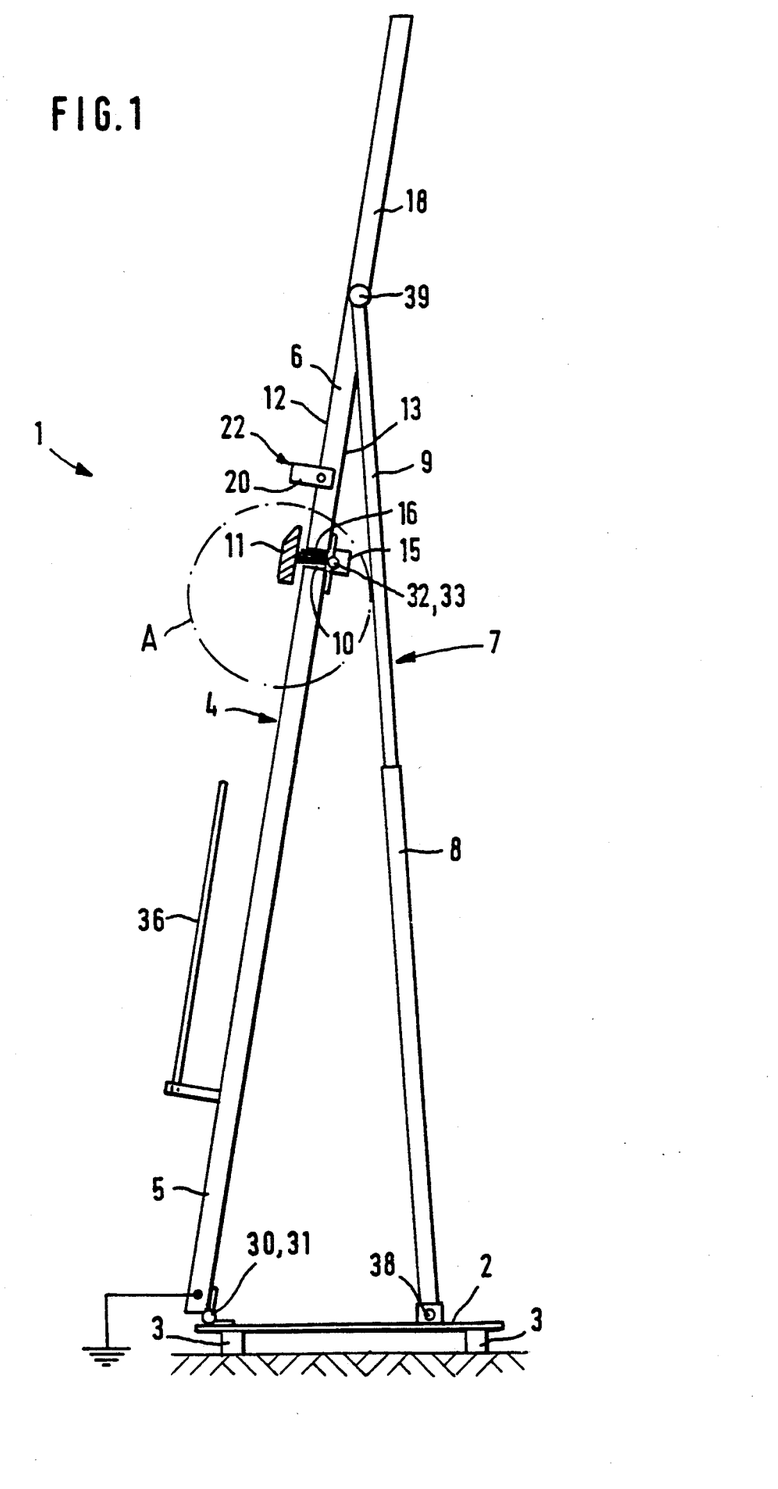
FIG. 1 is a side view of a first embodiment of an apparatus according to the invention.

In FIG. 1, a first embodiment of a peeling-off apparatus 1 for separating and drawing off a film, or some other material such as paper or metal foil, from a carrier material is represented diagrammatically in side view. The drawing-off apparatus 1 includes a base plate 2; four feet 3, for example rubber feet, for supporting the baseplate at its corners; a sloping platform 4; a separating apparatus 11; and two supports 7, each being disposed on a respective longitudinal side edge 18 of the platform 4.

Figures 2, 3, 4:
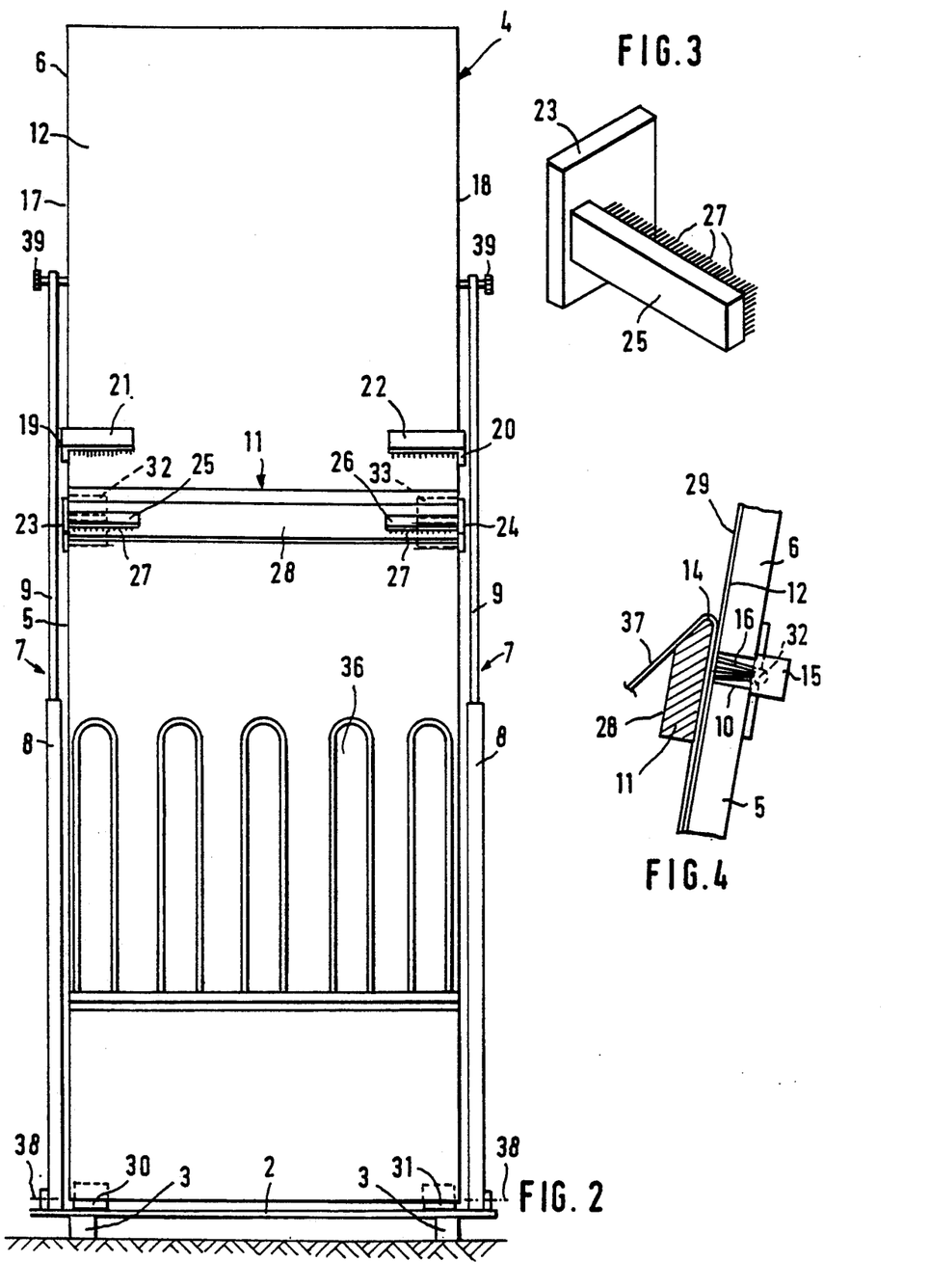
FIG. 2 is a front view of the apparatus according to FIG. 1.
FIG. 3 is a perspective side view of an element of the apparatus according to the invention.
FIG. 4 is a side view showing the detaching of a film from a carrier material by a separating apparatus.

The separating apparatus 11 is arranged parallel to the platform 4 at a certain distance from the front side 12 of the platform 4, and has a rounded-off upper edge 14, as can be seen from FIG. 4. A laminate which includes a carrier material 37 and a film 29 laminated thereon is pushed in the gap formed between the platform 4 and the separating apparatus 11. The separating apparatus 11 covers a transverse gap 10 formed in platform 4, as can be seen from FIGS. 1 and 2. The platform 4 is inclined at a vertical to horizontal ratio of ≦ to 10:1 with respect to the horizontal base plate 2. In particular, a ratio of 7:1 has proven to be very successful. If the platform 4 is positioned steeper, with respect to the horizontal base plate 2, than the aforementioned ratio of 10:1, difficulties will arise in peeling off the film 29 from the carrier material 37 using the separating apparatus 11, since the laminate tends to bend away from the platform in the form of a bow during its upward movement.

The carrier material 37 may be a film, on which for example a colored, light-sensitive synthetic resin layer is applied. The film 29 then serves as a receiving film for the colored synthetic resin layer, which in general is a polymer layer in which a corresponding dye is incorporated. During the detaching and separating of the film 29 from the carrier material 37, the colored synthetic resin layer is transferred from the carrier material 37 to the receiving film 29. Following this step, the exposure of the obtained color proof-film is performed. Similarly, it is possible to expose the color-proof film prior to the detaching step.

The carrier material 37 may also be a circuit board having a photoresist pattern exposed on it. In this case the film 29 is a protective film for the exposed photoresist pattern. After the circuit board has been exposed, the protective film 29 is removed and the photoresist pattern is developed in various baths. The protective film 29 must be removed without causing damage to the photoresist pattern and/or without residues of the protective film remaining on the photoresist film. In this situation, the platform 4 or the base plate 2 of the drawing-off apparatus 1 is grounded so that electric charges, which are produced during the peeling-off of the film 29 from the carrier material 37, can be led away from the film 29 to ground.

The platform 4 is connected to the base plate 2 with the aid of two hinges 30, 31, which are attached close to the lower edge of the platform 4. The platform 4 can be swivelled about these hinges, so that different sloping positions of the platform 4 with respect to the horizontal base plate 2 can be set. The support 7 is fastened to the base plate 2 as well as to the side edge 18 of the platform 4 by means of a screw 39.

Arranged on the rear side 13 of the platform 4 is a brush 15 having bristles 16 which penetrate the transverse gap 10 and bear with their tips against a rear side of the separating apparatus 11. If the laminate including carrier material 37 and laminated-on film 29 is pushed into the gap between the separating apparatus 11 and the platform 4, the bristles 16 of the brush 15 will push against the rear side of the laminate which bears against the front side 12 of the platform 4, and thereby permits only an upward movement of the laminate. The bristles 16 are aligned in such a way that they oppose a downward movement of the laminate along the sloping platform 4 with a sufficiently great resistance, so that the laminate is firmly clamped by its own accord in the gap between the separating apparatus 11 and the platform 4.

As FIG. 2 shows, in the lower part 5 of the platform 4, there is a basket 36 which is designed to receive laminates which are then pushed upward along the front side 12 of the platform 4 into the gap between the separating apparatus 11 and the platform 4. The basket 36 includes, for example, spaced-apart bent metal rods which are shaped into an elongated U.

Above the separating apparatus 11, on each side edge 17, 18 of the platform 4, there is an angle iron 19, 20, which bears an electrically conductive discharge brush 21, 22. The bristles of the discharge brushes 21, 22 bear against the front side 12 of the platform 4. The bristles of the discharge brushes 21, 22 extend over a transverse distance of 150 to 200 mm and, after the film has been peeled-off from the carrier material 37, the bristles of the discharge brushes 21, 22 touch the front side of the upwardly moving film 29. The carrier material 37 is generally a film, from which for example, a colored polymer compound is transferred onto the film 29, which serves as receiving sheet during the separating operation. The angle irons 19, 20 are, for example, attached to the two side edges 17, 18 of the platform 4 in such a way so that they can swivel. Thus, the bristles of the discharge brushes 21, 22 can be swivelled to touch the film 29 either at a right angle or at an angle which slightly deviates therefrom. The angle irons 19, 20 may also be attached in a fixed manner to the side edges 17, 18 of the platform 4. The bristles of the discharge brushes 21, 22 form a right angle with the leg of the angle iron to which they are attached. Similarly, it is possible that, instead of the two discharge brushes 21, 22, a single discharge brush can be provided which extends the full width of the platform 4.

In the region of the separating apparatus 11 there are on both side edges 17, 18 of the platform 4 additional angle irons 23, 24, each of which bears an electrically conductive discharge brush 25, 26 (cf. FIG. 3). The bristles of discharge brushes 25, 26 form a right angle with the leg of the angle iron to which they are fastened. The bristle tips 27 of the discharge brushes 25, 26 bear against the separating apparatus 11 on a side 28 which faces away from the platform 4, or are at such a small distance from side 28 that the carrier material 37, which is drawn off over the separating apparatus 11 and taken along the side of the separating apparatus 11, is in contact with the bristle tips 27. The bristles of the electrically conductive discharge brushes 25, 26 are preferably composed of stainless steel wires. Due to the contact of the bristle tips 27 of the discharge brushes 25, 26 with the carrier material 37, the electrostatic charges produced by the peeling-off operation are passed to ground, since, as already mentioned, either the platform 4 or the base plate 2 of the drawing-off apparatus 1 is grounded.

The detail A of FIG. 1 is represented on an enlarged scale in FIG. 4. As is evident from this representation, the separating apparatus 11 forms a bar edge, the upper edge 14 of which is rounded-off. In a further embodiment (not shown), the separating apparatus includes a wedge, the upper edge of which is likewise rounded-off. As soon as the laminate of carrier material and film 29 has reached the upper edge 14 of the bar edge of the separating apparatus 11, the carrier material is drawn off downwardly at an oblique angle from the film 29, either by manual means or by means of grippers, so that it moves over the rounded-off edge 14. During this operation, the film 29 continues to move upward along the front side 12 of the platform 4 until the carrier material 37 has been completely peeled-off from the film 29. Subsequently, the film 29, which serves as receiving sheet can be subjected to additional processing.

Each of the two supports 7 is connected to the base plate 2 by means of a swivel joint 38, as shown in FIG. 2. The individual supports 7 each include an upper section 9 and a lower section 8, with the upper section 9 having a smaller cross-section than the lower section 8. Support 7 is a telescopically designed support which is similar to a telescopic braking shaft, such as those used for example, for supporting the trunk lids of cars.

The platform 4 is divided into two parts by the region of the transverse gap 10, and includes a lower part 5 and an upper part 6, which are connected to each other by hinges 32, 33. The hinges 32, 33 are located close to the transverse gap 10. The upper part 6 may, if required, such as when the peeling-off apparatus 1 is to be transported, be folded against the lower part 5. For this purpose, the two screws 39 which fasten the supports 7 to the side edges 17, 18 of the platform 4 are withdrawn. During the folding-over of the upper part 6 of the platform 4, the upper section 9 of the support 7 can at the same time be telescopically pushed into the lower section 8. Since the support 7 is fastened on the base plate 2 by means of the swivel joint 38, the support 7 has a corresponding degree of freedom relative to the platform 4 so that during the folding-together of the peeling-off apparatus 1, it can be swivelled about the swivel joint 38 allowing the folding-together of the platform 4 and the telescopic retraction of the support 7 to be carried out without difficulty.

The separating and drawing-off of the film from the carrier material proceeds as follows:

The laminate, comprising the film 29 and the carrier material 37, is removed from the basket 36 and pushed into the gap between the separating apparatus 11 and the front side 12 of the platform 4, until the upper edge of the laminate lies above the upper edge 14 of the separating apparatus 11. In this position, the laminate is pressed by the bristles 16 of the brush 15 in the region of the transverse gap 10 against the rear side of the separating apparatus 11 and thereby held firm. The carrier material 37 or the carrier film, is detached at the front edge from the film 29, is angled off over the rounded-off upper edge 14 of the separating apparatus 11, and is drawn downward either manually or by means of gripper bars at an oblique angle. The exposed colored polymer material is thereby transferred from the carrier film onto the film 29, which for example, receives a positive image, whereas a negative image is preserved on the carrier film 37. During the peeling-off of the carrier material 37, the laminate continues to move upward along the platform 4. After the complete peeling-off of the carrier material 37 from the image-receiving film 29, the image-receiving film 29 can be moved and subjected to subsequent finishing steps.

Figure 5:
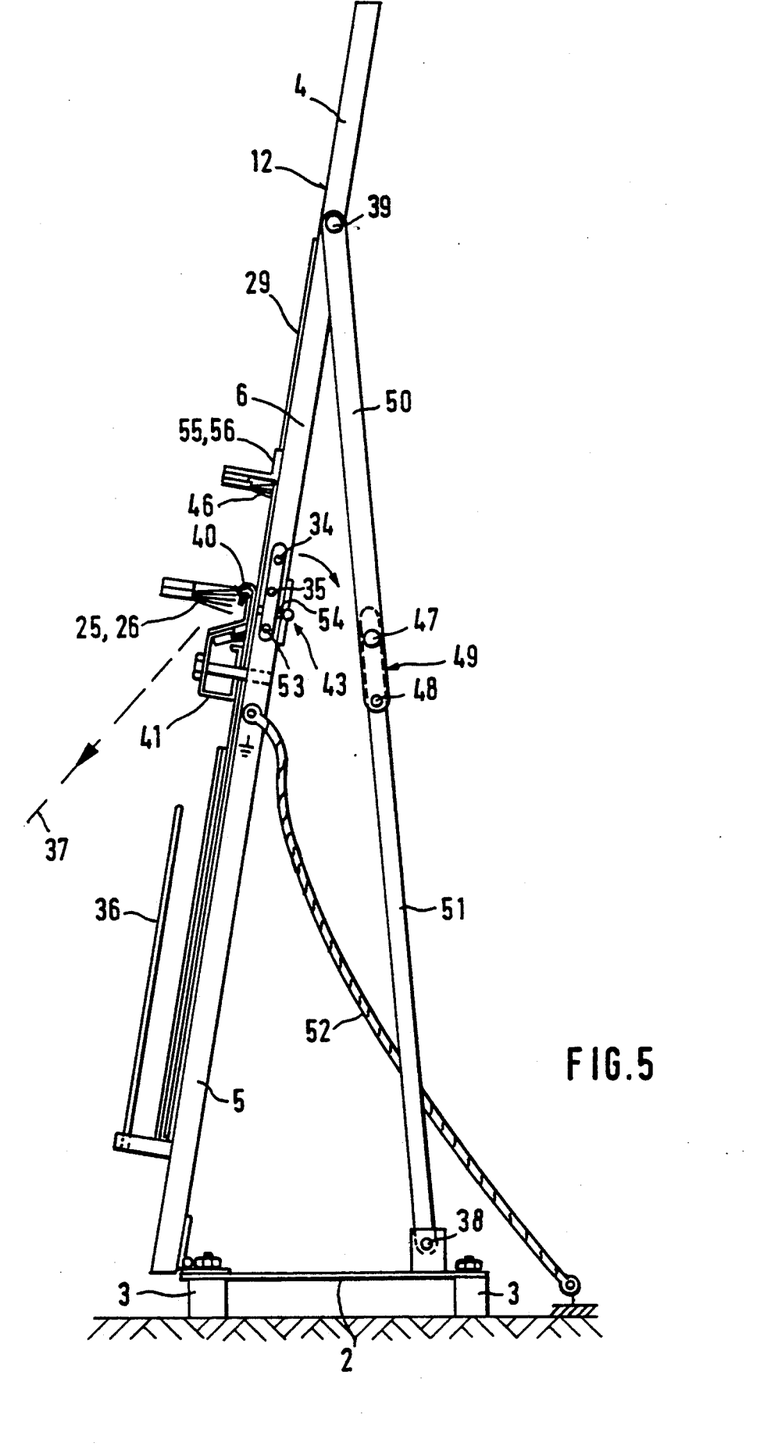
FIG. 5 is a side view of a second embodiment of the apparatus according to the invention.
Figure 8:
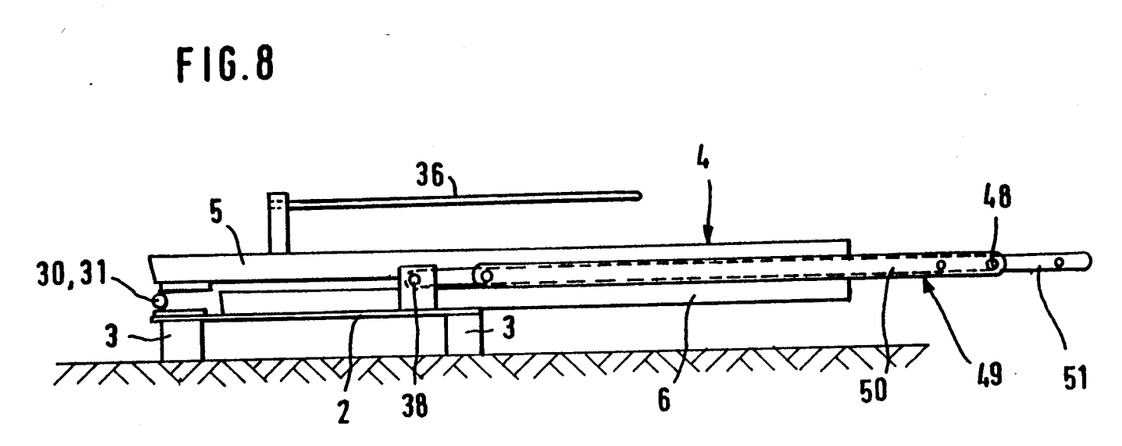
FIG. 8 is a side view showing the apparatus in the folded-up state.

In FIG. 5, a second embodiment of the peeling-off apparatus 1 is shown in side view. The same components as are used in the first embodiment are denoted by the same reference numerals in FIG. 5. The essential differences of the second embodiment from the first embodiment are that 1) the brush 15, which is a holding brush for the laminate, is arranged on the front side 12 of the platform 4 instead of on its rear side, and is accommodated, together with a peeling-off edge 40, in a separating/holding element 41, and 2) the supports 49 are not telescopically designed but are foldable relative to each other. Each of the supports 49 is arranged along the side edges of the platform 4 and has approximately in its center, a joint 48, above which there is a releasable screw 47 which prevents the platform 4 from folding when inserted. The upper end of each support is connected to the platform 4 by a screw 39, whereas the lower end is fastened to the base plate 2 by means of a swivel joint 38. After withdrawing the screws 39, 47, the upper section 50 of the support 49 can be folded so that it comes to rest on the lower section 51 of the support 49, as is shown in FIG. 8.

The platform 4 is connected via a flexible shielded cable 52 to ground, and the separating/holding element 41 is arranged at a distance from the front side 12 of the platform 4 close to a joint 53 of the platform 4. A gap 54 (see FIG. 7) separates the lower part 5 of the platform 4 from the upper part 6 of the platform 4. On the rear side 13 of the platform 4 there is, at the level of the gap 54, a hinge 43, which extends over the width of the platform 4 and connects the lower and upper parts 5, 6 to each other so that the upper part 6 can be folded onto the lower part 5 subsequent to withdrawal of the screw 39, and screws 34 and 35 of the joint 53.

Figure 6:
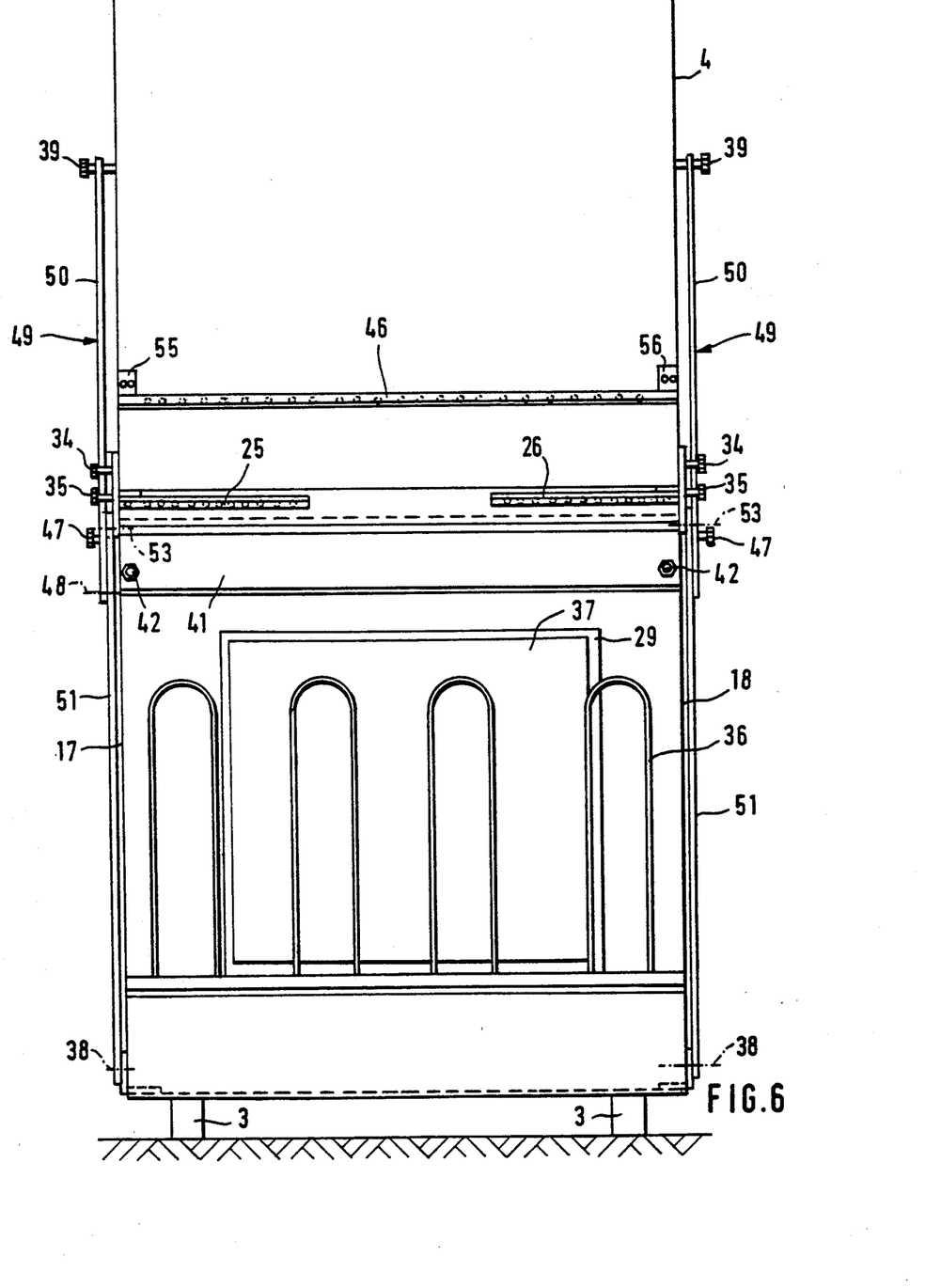
FIG. 6 is a front view of the apparatus according to FIG. 5.

As shown in FIG. 6, two angle irons 55, 56 are arranged above the joint 53 at the front side 12 of the platform 4. A continuous discharge brush 46 is arranged on the two angle irons 55, 56 and extends over the width of the platform 4. The bristles of the brush 46 are directed perpendicularly toward the platform 4. The bristle tips are in contact with the film 29, which is pushed upward during the peeling-off movement. The angle irons 55, 56 are expediently screwed to the front side of the platform 4 and, after the release of this screw connection can be taken off the platform 4 together with the discharge brush 46. The discharge brushes 25, 26 lying at the level of the screws 35 are designed and fastened to the platform 4 in the same way as described in the first embodiment of the apparatus. The angle irons 23, 24 of the discharge brushes 25, 26 are likewise releasably screwed to the platform 4.

The front view of the platform 4 in FIG. 6 reveals the arrangement of the discharge brushes 25, 26 and 46. The basket 36 is reflected as having laminates stored therein.

Figure 7:
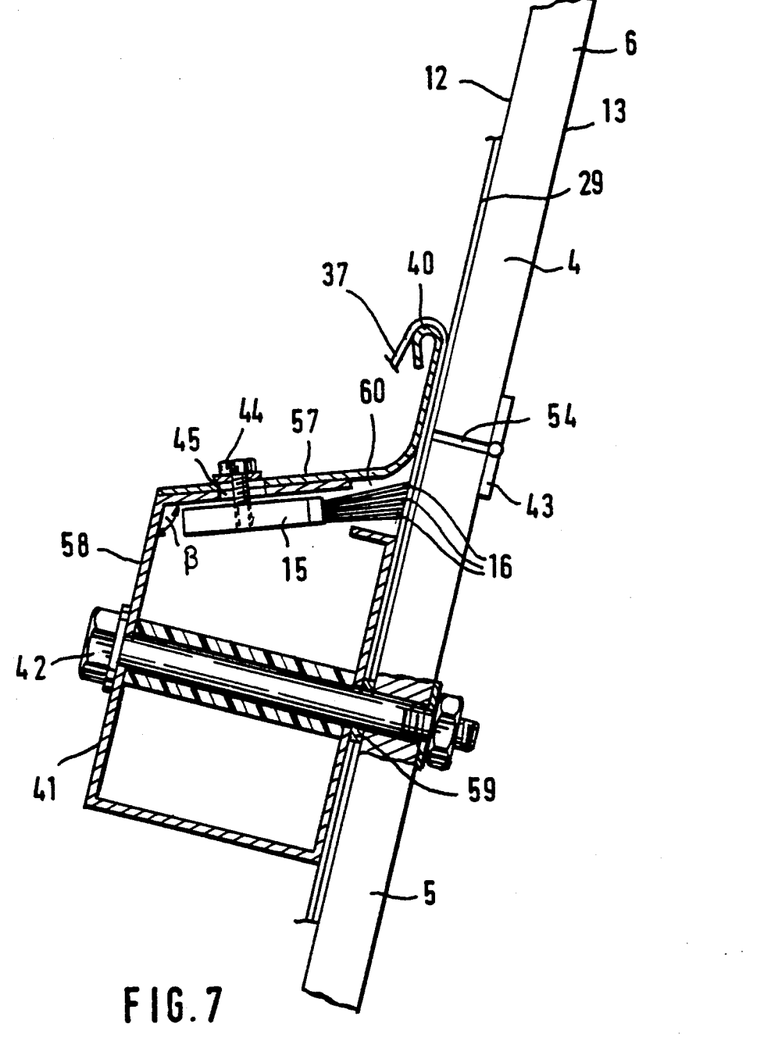
FIG. 7 is an enlarged side view showing an element of the apparatus according to FIG. 5.

In FIG. 7, the separating/holding element 41 is shown enlarged and in section. The element 41 includes a box-like hollow profile of substantially rectangular cross section, and an upper profile side 57 forming an angle $\beta > 90°$ with its adjacent profile side 58 such that an opening 60 is erected in the box-like profile. The upper profile side 57 is extended upward and bent in such a way that the bent part runs parallel to the sloping platform 4. The termination of side 57 is formed as a rounded-off peeling-off edge 40, over which the carrier material 37 is led away from the front side of the platform 4 during the peeling-off operation.

The separating/holding element 41 extends over the width of the platform 4 and is screwed in place by two locked screws 4 2, which extend through the profile cross-section and into platform 4. Between the front side 12 of the platform 4 and the profile side adjacent thereto, a shim 59 is mounted on the screws 42, which creates a gap of approximately 3 to 5 mm between the platform 4 and the separating/holding element 41. Arranged inside the separating/holding element 41, on the inside of the upper profile side 57, is the brush 15. The bristles 16 of brush 15 extend through the opening 60 of the profile and bear against the laminate, thereby holding the laminate firmly in place, so that it is prevented from slipping downward over the sloping platform, as for example, when the peeling-off movement is stopped or has ended. In the upper profile side 57 there is an oblong hole 45, which is penetrated by a setscrew 44 for the brush 15. The setscrew 44 is connected to the brush 15, and can assume various positions within the oblong hole 45 corresponding to a desired position of the brush 15. Due to the ability to adjust the brush 15, via setscrew 44, the apparatus can accommodate laminates of different thicknesses, since the contact between the bristles 16 and the laminate can be ensured even for very thin laminates.

The peeling-off operation of the second embodiment proceeds in a similar way as described with reference to the first embodiment of the apparatus. Therefore, a description of this operation is not repeated.

In FIG. 8, the second embodiment of the apparatus is shown in its folded state. In order to be able to perform this folding, the screws 39 and 47 must be withdrawn, so that the supports 49 can be folded in a clockwise manner about joint 48. The upper section 50 can then be brought to bear against lower section 51, which itself can be swivelled about swivel joint 38. Furthermore, the discharge brushes 25, 26 and 46 are unscrewed from the front side of the platform 4 and the screws 34 and 35 above the joint 53 are withdrawn. Furthermore, the separating/holding element 41 is separated from the platform 4 by withdrawing screws 42. Subsequently, the upper part 6 of the platform 4 is folded clockwise about hinge 54 until it rests against the lower part 5 of the platform 4. Both the folded supports 49 and the folded platform 4 are subsequently folded in a clockwise manner until they rest on the base plate 2, as is shown in FIG. 8. The total volume of the folded peeling-off apparatus 1 is significantly reduced as compared to its volume when in an operational state. Thus, the folded peeling-off apparatus 1 takes up very little volume when being transported and is significantly easier to handle than in its erected state.

While several embodiments of the invention have been described, it will be understood that further modifications are still capable, and this application is intended to cover any variations, use or adaptation of the invention and including such departures from the present disclosure as to come within the knowledge of customary practice in the art to which the invention pertains, and as may be applied to the essential features hereinbefore set forth and following within the scope of the invention and the limits of the appended claims.

What is claimed is:

1. An apparatus for peeling off a film from a laminate, the laminate including the film and a carrier material to which the film is laminated, the apparatus comprising;
    a horizontal base plate;
    a platform having an upper portion, a lower portion, a front side, and a transverse gap which divides said upper portion from said lower portion, said platform being inclined relative to said horizontal base plate at a vertical to horizontal ratio of $\leq 10:1$ and said laminate being guided over said platform; and
    a separating apparatus being disposed proximate to said transverse gap at a distance from and parallel to said front side.

2. An apparatus as claimed in claim 1, wherein said separating apparatus includes a bar having a rounded-off upper edge.

3. An apparatus as claimed in claim 2, wherein said bar covers said transverse gap, and further comprising a brush having bristles which are arranged on a rear side of the platform, said bristles penetrating said transverse gap and bearing with their tips against a rear side of said separating apparatus.

4. An apparatus as claimed in claim 1, wherein said separating apparatus includes a wedge having a rounded-off upper edge.

5. An apparatus as claimed in claim 4, wherein said wedge covers said transverse gap, and further comprising a brush having bristles which are arranged on a rear side of the platform, said bristles penetrating said transverse gap and bearing with their tips against a rear side of said separating apparatus.

6. An apparatus as claimed in claim 1, wherein said platform is grounded.

7. An apparatus as claimed in claim 1, wherein said horizontal base plate is grounded.

8. An apparatus as claimed in claim 1, further comprising a pair of angle irons each being arranged above said separating apparatus on respective side edges of the platform so that said angle irons swivel, and a pair of electrically conductive discharge brushes having bristles, each of said brushes being connected to a corresponding one of said angle irons, such that said bristles touch said front side of said platform over a distance of approximately 150 to 200 mm.

9. An apparatus as claimed in claim 8, wherein said bristles are made from stainless steel wires.

10. An apparatus as claimed in claim 1, further comprising a pair of angle irons disposed at respective side edges of said platform, and a pair of electrically conductive discharge brushes each having bristles and being connected to a corresponding one of said angle irons, said bristles having tips thereon which bear against a side of said separating apparatus which faces away from said platform.

11. An apparatus as claimed in claim 10, wherein said bristles are made from stainless steel wires.

12. An apparatus as claimed in claim 1, further comprising two hinges which connect said platform to said base plate, and two supports which are each connected to said base plate and to a side edge of the platform.

13. An apparatus as claimed in claim 12, further comprising screws which fasten upper ends of said two supports to said platform, and wherein each of said two supports includes a lower section and an upper section which can be displaced telescopically one in the other when said screws are removed.

14. An apparatus as claimed in claim 13, wherein each of said upper sections has a smaller cross-section than said lower sections, so that said upper sections can be pushed telescopically into said lower sections.

15. An apparatus as claimed in claim 12, wherein each of said two supports is connected to said base plate by a swivel joint.

16. An apparatus as claimed in claim 1, further comprising hinges, and wherein said lower and upper portions are connected to each other by said hinges proximate to said transverse gap, so that said upper portion can be folded against said lower portion.

17. An apparatus as claimed in claim 1, further comprising a basket for receiving laminates which is disposed on said front side of said platform below said transverse gap.

18. An apparatus as claimed in claim 27, wherein said separating apparatus includes a rounded-off peel edge, and further comprising a separating/holding element which includes said rounded-off peel edge and a brush.

19. An apparatus as claimed in claim 18, further comprising a pair of bolts, and a pair of shims, each of said shims being disposed around a corresponding one of said pair of bolts,
wherein said separating/holding element has a box-like cross-sectional profile, first and second lateral sides, and an upper side;
said pair of bolts pass through said box-like cross-sectional profile and into said platform, thereby connecting said separating/holding element to said platform;
each of said pair of shims is disposed between said front side of said platform and said first lateral side so that a space of approximately 3 mm to 5 mm is formed between said platform and said separating/holding element;
said upper side of said separating/holding element forms an angle of >90° with said second lateral side creating an opening in said separating/holding element.

20. An apparatus as claimed in claim 19, wherein said upper side is the longest side of said separating/holding element and has a bent part which runs parallel to said front side of said platform, said bent part terminating at said rounded-off peel edge.

21. An apparatus as claimed in claim 19, wherein said brush is fastened on an inner side of said upper side of said holding/separating element by means of a setscrew and has bristles which protrude through said opening, said setscrew penetrates an oblong hole in said upper side of said holding/separating element and is adjustable within said oblong hole to allow said bristles to contact said laminate.

22. An apparatus, as claimed in claim 1, further comprising a connector and screws located above said connector, wherein said lower portion and said upper portion are connected to each other by said connector at corresponding side edges of said upper and lower portions, and said screws fix said upper and lower portions in an aligned position with respect to each other.

23. An apparatus as claimed in claim 22, wherein said connector and said screws are arranged proximate to said gap.

24. An apparatus as claimed in claim 23, further comprising a hinge proximate to said gap which connects the upper and lower portions to each other at a rear side of the platform.

25. An apparatus as claimed in claim 12, further comprising a connector and a screw disposed above said connector, and wherein each of said pair of supports includes an upper section and a lower section which are connected to each other by said connector, said screw fixes said upper and lower sections so that they are in an aligned position, and said upper section is connected to said side edge of said platform by said screw.

26. An apparatus as claimed in claim 1, further comprising a pair of angle irons being fixed to said front side of said platform above said separating apparatus and proximate to lateral side edges of said platform, and a continuous discharge brush extending over the width of said platform and being fastened by its ends to said angle irons.

27. An apparatus for peeling-off a film from a laminate, the laminate including the film and a carrier material to which the film is laminated, the apparatus comprising;
a horizontal base plate;
a platform having an upper portion, a lower portion, a front side, and a gap which divides said upper portion from said lower portion, said platform being inclined relative to said horizontal base plate at a vertical to horizontal ratio of $\leq 10:1$ at times when said laminate is being guided over said platform; and
a separating apparatus being disposed proximate to said gap at a distance from and parallel to said front side.

* * * * *